United States Patent [19]

Yanagi

[11] Patent Number: 5,189,653
[45] Date of Patent: Feb. 23, 1993

[54] OPTICAL DISK DEVICE ELIMINATING OFFSET OF ACTUATOR AND OFFSET ELIMINATING METHOD USED THEREBY

[75] Inventor: Shigenori Yanagi, Kawasaki, Japan
[73] Assignee: Fujitsu Limited, Kawasaki, Japan
[21] Appl. No.: 568,874
[22] Filed: Aug. 17, 1990

[30] Foreign Application Priority Data

Aug. 19, 1989 [JP] Japan .................. 1-213421

[51] Int. Cl.$^5$ .............................................. G11B 7/00
[52] U.S. Cl. ............................. 369/44.32; 369/44.34
[58] Field of Search ............... 369/32, 44.15, 44.16, 369/44.25, 44.27, 44.28, 44.32; 358/907; 360/77.04, 78.05, 78.06, 78.07

[56] References Cited

U.S. PATENT DOCUMENTS

| | | | |
|---|---|---|---|
| 4,330,880 | 5/1982 | Van Dijk | 369/32 |
| 4,589,102 | 5/1986 | Volleau et al. | 369/44.32 |
| 4,634,853 | 1/1987 | Kanamaru | 369/44.25 |
| 4,674,076 | 6/1987 | Hsieh et al. | 369/44.28 |
| 4,718,050 | 1/1988 | Kurz et al. | 369/44.25 |
| 4,768,180 | 8/1988 | Janssen et al. | 369/44.32 |
| 4,769,803 | 9/1988 | Yamamiya | 369/44.25 |
| 5,029,150 | 7/1991 | Kiyoshi | 369/44.25 |

FOREIGN PATENT DOCUMENTS

| | | | |
|---|---|---|---|
| 59-28255 | 2/1984 | Japan | 369/44.25 |
| 59-77639 | 4/1984 | Japan . | |

*Primary Examiner*—Donald McElheny, Jr.
*Attorney, Agent, or Firm*—Staas & Halsey

[57] ABSTRACT

An optical disk device for eliminating an offset of an actuator which controls a fine adjustment of a tracking control. In the device, during an offset measuring mode, an electric drive current of the actuator is changed and the drive current is stored and held when a detection output at a neutral position in a position detector of the actuator is obtained. Then, during a usual operation mode, the obtained offset current is constantly supplied as the drive current of the actuator, whereby a spring force is cancelled and an offset of the tracking error signal is eliminated.

7 Claims, 10 Drawing Sheets

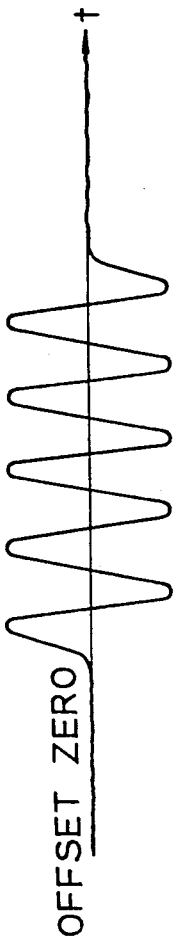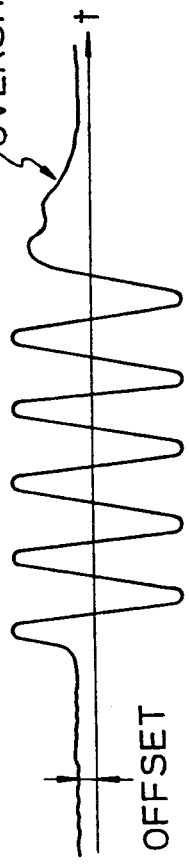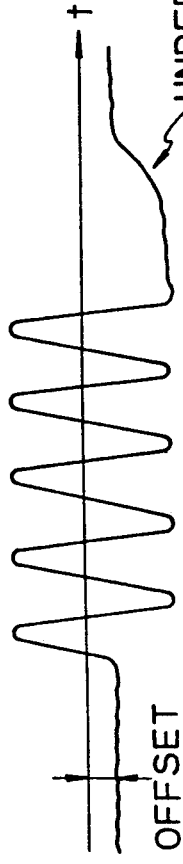

| Fig.4A |
| Fig.4B | an OPTICAL DISK DEVICE ELIMINATING OFFSET OF ACTUATOR AND OFFSET ELIMINATING METHOD USED THEREBY

BACKGROUND OF THE INVENTION

1. Field of the Invention

The present invention relates to an optical disk device for eliminating an offset of an actuator, and an offset eliminating method used thereby

2. Description of the Related Art

Writing or reading by an accurate tracing of a track in an optical disk requires tracking control by a beam spot which can accurately trace the track. Accordingly, an optical head mounted on a carriage is provided with a tracking actuator which moves the beam spot in a radial direction within a predetermined range of the track width in the carriage stationary state. The tracking actuator includes a magnetic field structure, as a stationary member, and a rotation member provided with a tracking coil. The beam spot from an object lens is moved perpendicular to the track of the optical disk by providing an object lens of a head optical system at the rotation member side, and by rotating the rotation member by supplying an electric power to the tracking coil.

Usually, tracking control is accomplished by feedback control of electric current through the tracking coil. A tracking detection signal is held at zero, in accordance with a tracking error detection signal obtained as a difference of an output obtained by making a light reflected from the disk incident on a two-divided photodiode, through the head optical system.

Further, a position detector using a two-divided photodiode for detecting a neutral position of the rotation member of the tracking actuator, i.e., a position at which the rotation is stopped when the electric power supplied to the coil is cut, is provided. The position signal in the track direction (radial direction) is detected as a difference of the two incident lights. The track position detection signal is used for control of the holding of the head carriage, which is controlled by a voice coil motor, and holds the rotation member of the actuator at the neutral position by supplying a drive current to the voice coil motor so as to hold the track direction position detection signal at zero.

As a result, the actuator is controlled by a double servocontrol wherein the actuator is controlled by feedback control to the tracking coil receiving the tracking error signal and to the voice-coil motor receiving the track direction position signal.

The rotation member of the tracking actuator is provided with a spring member for returning the rotation member to the neutral position when the electric current supplied to the coil is cut off. The balance of the position of the rotation member when held by the spring member does not always coincide with the neutral position whereat the detection signal of the position detector is zero.

If a difference occurs between the balance position of the spring member and the zero signal position of the position detector an offset in the tracking error signal due to a spring force is generated when the tracking control by the double servocontrol is executed. If this offset due to the spring force exists, when the tracking control is turned OFF and the track actuator is driven by the velocity control at the track jump, an undershoot or overshoot occurs at the end of the track jump. Accordingly, preferably the control has a response characteristic at the track jump that is not adversely affected because the offset due to the spring force is suppressed.

SUMMARY OF THE INVENTION

An object of the present invention is to eliminate an offset of an actuator in an optical disk device so that an unbalance due to a spring force does not affect the control characteristics, and a stability and response characteristic is increased at a track jump.

According to an aspect of the present invention there is provided a device for eliminating an offset of an actuator comprising an actuator including a fixed member, a moving member mounted on the fixed member, a drive means provided on the moving member, a spring member for holding the moving member to the fixed member at a predetermined neutral position when an electric power is not supplied to the drive means, and a position detection means for detecting the neutral position of the moving member when held by the spring member. In addition, an offset measuring means changes an electric drive current of the drive means and stores and holds a value of an electric current supplied to the drive means when the detection output of a neutral position by the position detection means is obtained during an offset measuring mode. Further, an offset elimination means eliminates the offset included in a moving means drive error signal by constantly supplying the electric drive current offset value stored and held in the offset measuring means to the drive means during the usual operation mode.

According to another aspect of the invention there is provided an optical disk device for eliminating an offset of an actuator comprising an actuator including a magnetic field structure, a rotation member rotatably mounted on the magnetic field structure, a tracking coil provided on the rotation member, a spring member for holding the rotation member at a predetermined neutral position when an electric power is not supplied to the tracking coil, and a position detection means for detecting the neutral position of the rotation member when held by the spring member. In addition, an offset measuring means changes an electric drive current of the tracking coil and for stores and holds a value of an electric current supplied to the tracking coil when the detection output of a neutral position by the position detection means is obtained during an offset measuring mode. Further an offset eliminates means for eliminating the offset included in a tracking error signal by constantly supplying the electric drive current offset value stored and held in the offset measuring means to the tracking coil during the usual operation mode.

According to yet another aspect of the invention there is provided an optical disk device for eliminating an offset of an actuator comprising an actuator including a galvanomirror for reflecting light from a light source in a substantially perpendicular direction, an object lens for receiving the light reflected from the galvanomirror and supplying the light to the optical disk, a position detection means for projecting a light from a light source to a two-divided optical sensor through another reflection surface of the galvamiorror and for detecting a neutral position thereof, and a spring member attached to the galvanomirror for balancing the galvanomirror in a balanced position thereof. In addition, an offset measuring means changes an electric drive current of a drive means of the galvanomirror and for stores and holds an electric drive current value when the output of a detection of a neutral position by the position detection means is obtained during an offset measuring mode. Further, an offset elimination means eliminates the offset in a tracking error signal by constantly supplying the electric drive current offset value stored and held in the offset measuring means to a drive means of the galvanomirror, during the usual operation mode.

According to still another aspect of the invention there is provided an optical disk device for eliminating an offset of an actuator comprising an actuator including a relay lens for receiving light from a light source, a mirror for reflecting the light from the relay lens in a substantially perpendicular direction, an object lens for receiving the light reflected from the mirror and for illuminating an optical disk, a spring member for connecting the relay lens to a fixed board, and a position detection means having a slit connected to the relay lens and responsive to the movement of the relay lens in the direction perpendicular to the incident light, a light emitting source for supplying light therefrom to the slit, and a two-divided optical sensor for receiving the light from the light emitting source through the slit. In addition an offset measuring means changes an electric drive current of a drive means of the relay lens and stores and holds an a electric drive current value when the output of a detection of a neutral position by the position detection means is obtained during in an offset measuring mode. Further, an offset elimination means eliminates the offset in a tracking error signal by constantly supplying the electric drive current offset value stored and held in the offset measuring means to the drive means of the relay lens during the usual operation mode.

According to another aspect of the invention there is provided a method of eliminating an offset in an optical disk device having an actuator including a moving member for a fine adjustment of a tracking control when accessing an optical disk, a spring member for holding the moving member at a predetermined balanced position thereof, and a position detection means for detecting a neutral position of the moving member, the method comprising the steps of increasing or decreasing an electric drive current supplied to the moving member by a predetermined step when released from the tracking control, storing the electric drive current value as an offset current when a position detection error signal by the position detection means becomes zero, and supplying the offset current as an electric drive current to the moving member in a tracking control state.

Other features and advantages of the invention will be apparent from the following description given with reference to the accompanying drawings.

BRIEF DESCRIPTION OF THE DRAWINGS

FIGS. 2A, 2B, and 2C are graphs of tracking error signals due to an offset caused by a spring force at a track jump;

DESCRIPTION OF THE PREFERRED EMBODIMENTS

Prior to the explanation of the preferred embodiments, related art is explained with reference to FIGS. 1 and 8 to 11, for comparison.

Figure 8:
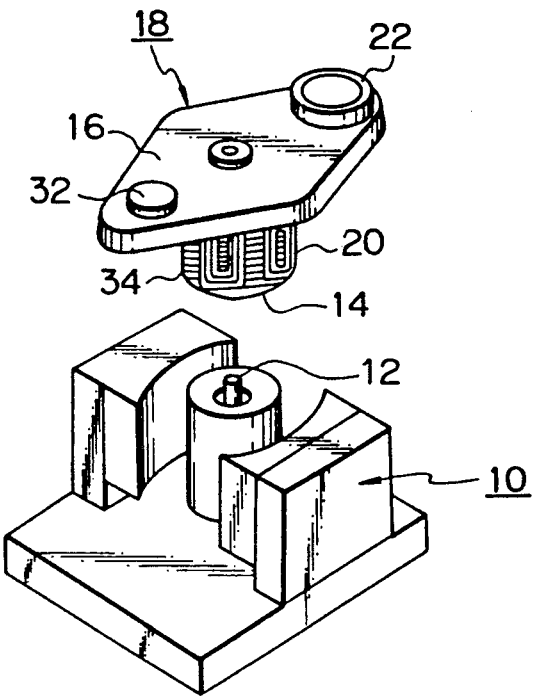
FIG. 8 is a perspective view of a first example of an actuator used in the optical disk device of FIGS. 4A and 4B.

FIG. 8 is an actuator for tracking as used in an optical disk device. This is known as a two-dimensional actuator because a tracking control and a focusing control are executed simultaneously.

Namely, the actuator comprises a magnetic field structure 10 as a stationary member having a sliding shaft 12, and a rotation member 18 as rotary member. The rotation member 18 comprises a cylinder 14 and an upper rotary arm 16 as one body. The cylinder 14 is provided with a tracking coil 20. Further, the rotary arm 16 is provided with an object lens 22 at one end and a balance weight 32 at the other end. Furthermore, a focusing coil 34 is wound inside the tracking coil 20.

Figure 9:
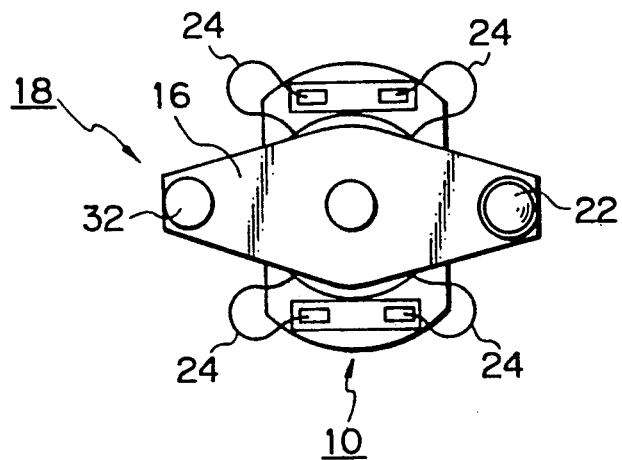
FIG. 9 is a plan view of the actuator of FIG. 8.

FIG. 9 shows a plan view of the actuator, wherein lead wires from the magnetic field structure 10 to the tracking coil 20 and focusing coil 34 provided on the rotation member 18 act as spring members 24, whereby the rotation member 18 is held at the neutral position when an electric current passed through the coil 20 is cut off, as shown in the FIG. 9.

Figure 10:
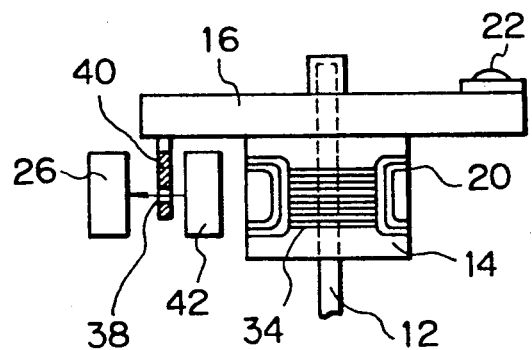
FIG. 10 is a side view of a rotary portion of the actuator of FIG. 8.

FIG. 10 is a position detector provided in the actuator, wherein a projecting slit member 40, provided with a slit hole 38 at the lower portion in the balance weight side of the rotary arm 16, allows light from a light-emitting diode (LED) 42 provided at the inner side of the slit member 40 to be supplied to a two-divided photodiode 26 acting as a position detector and arranged to face the LED 42 through the slit hole 38.

Figure 11:
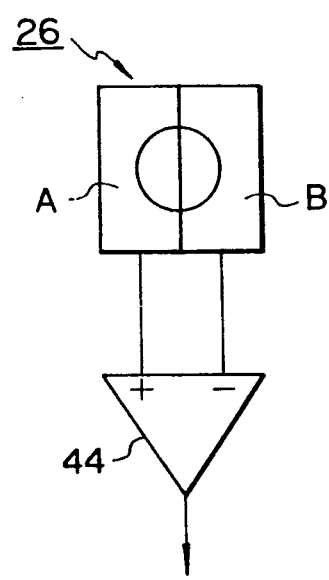
FIG. 11 is a circuit diagram of a detector in the actuator of FIG. 8.

FIG. 11 shows a detection circuit for detecting the track direction position signal from the two-divided photodiode 26 shown in FIG. 10, wherein a difference signal is obtained from two incident lights by supplying two light signals from two light reception portions A and B to a differential amplifier 44. When the rotation member of the actuator is at the neutral position, as shown in FIG. 11, the spot light is supplied so that the light reception portions A and B are symmetric, and an output signal of the differential amplifier 44 becomes zero when the rotation member is at the neutral position. When an amount of rotation of the actuator is increased, the detection signal is increased in response to the amount of rotation, and a difference in the polarity thereof according to the rotation direction is obtained.

Figure 1:
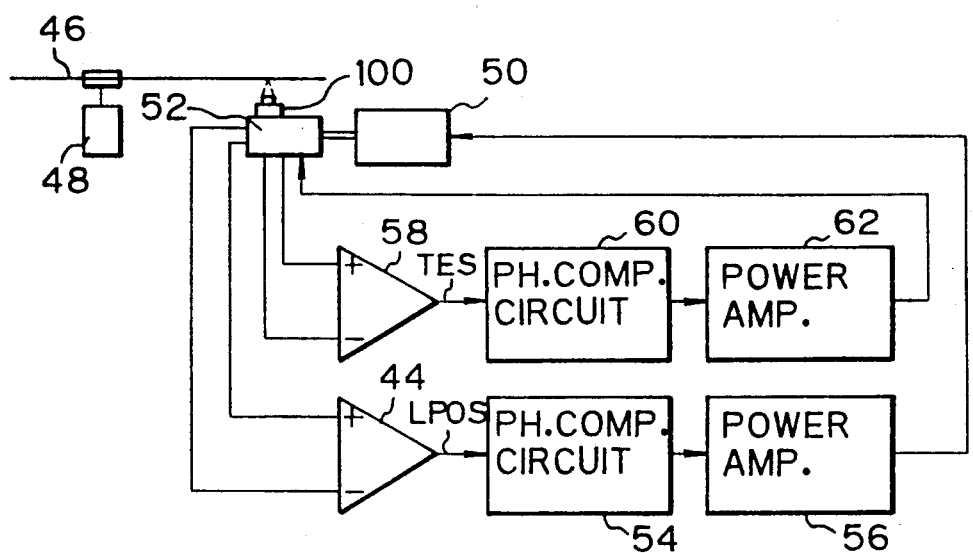
FIG. 1 is a block diagram for explaining a conventional double servocontrol.
Figure 3:
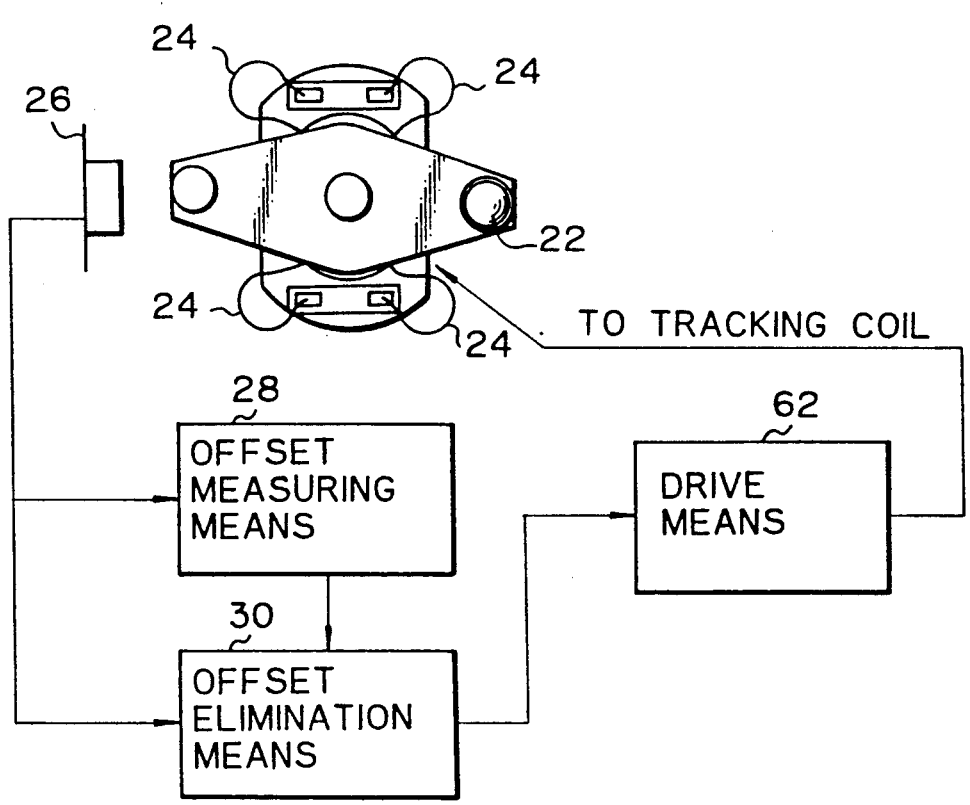
FIG. 3 is a block diagram for explaining the present invention; r.

FIG. 1 is a block diagram of the double servocontrol of the actuator.

As shown in FIG. 1, an optical disk 46 is rotated constantly by a spindle motor 48, and an optical head 100 mounted on a carriage 52 is moved radially over the optical disk 46 by a voice coil motor 50.

The actuator is mounted on the optical head 100 as shown in FIGS. 8, 9, and 10, and is provided with the two-divided photodiode 26 for position detection. The two-divided photodiode receives light reflected from the disk for the tracking error detection.

The two outputs of the two-divided photodiode for position detection are supplied to the differential amplifier 44. A track direction position signal LPOS showing both the track direction (polarity) and the track position (signal intensity) as a difference thereof is detected. After phase compensation emphasizing a high frequency component, by a phase compensation circuit 54 a power amplifier 56 drives the voice coil motor 50 and controls the track direction position signal to zero.

The two outputs of the light reflected from the disk from the two-divided photodiode are obtained by the head optical system and supplied to a differential amplifier 58. The tracking error signal TES is detected as a difference thereof and drives the tracking coil through a phase compensation circuit 60 and a power amplifier 62 so that the feedback control is executed to hold the tracking error signal TES at zero.

Figure 13:
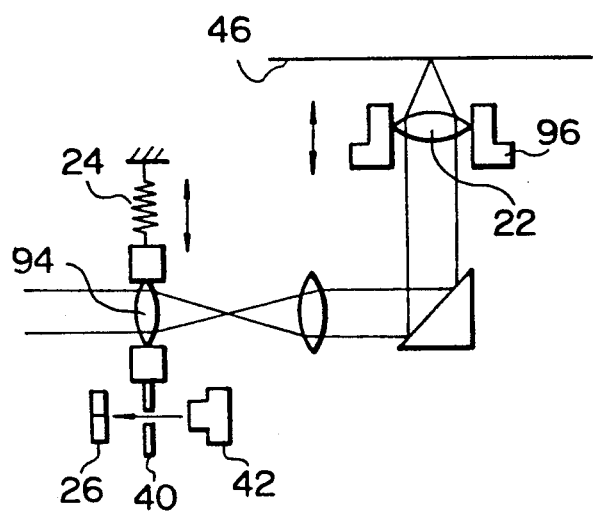
FIG. 13 is an explanatory diagram of a third example of an actuator in the optical disk device of FIGS. 4A and 4B.

In the conventional tracking actuator, however, the position of the rotation member 18 when balanced by the spring members 24, shown in FIG. 13, usually does not coincide with the zero signal position of the detection signal LPOS from the two-divided photodiode for the position detection shown in FIG. 8. Thus, a problem arises in that when the double servocontrol is executed by the feedback controls of the tracking coil and the voice coil motor, an offset due to the spring force, is generated in the tracking error signal TES. When a track jump is executed an overshoot or undershoot occurs and the stability and the response characteristic are lowered.

FIGS. 2A, 2B, and 2C show an effect of the tracing error signal TES due to the spring force, at the track jump.

First, as shown in FIG. 2A, when the spring force is zero, at the end of the track jump the tracking error signal is rapidly converged to zero and the tracking servo can be turned ON.

Nevertheless, when an offset is generated due to the spring force, as shown in FIGS. 2B and 2C, an overshoot or undershoot occurs in the tracking error signal TES at the end of the track jump, due to the effect of the offset. A time delay occurs before the tracking servo can be turned ON when the signal becomes zero, and thus a problem arises in that the stability and response characteristic are lowered.

An embodiment of the present invention is now explained with reference to the drawings.

Figures 4, 4A:
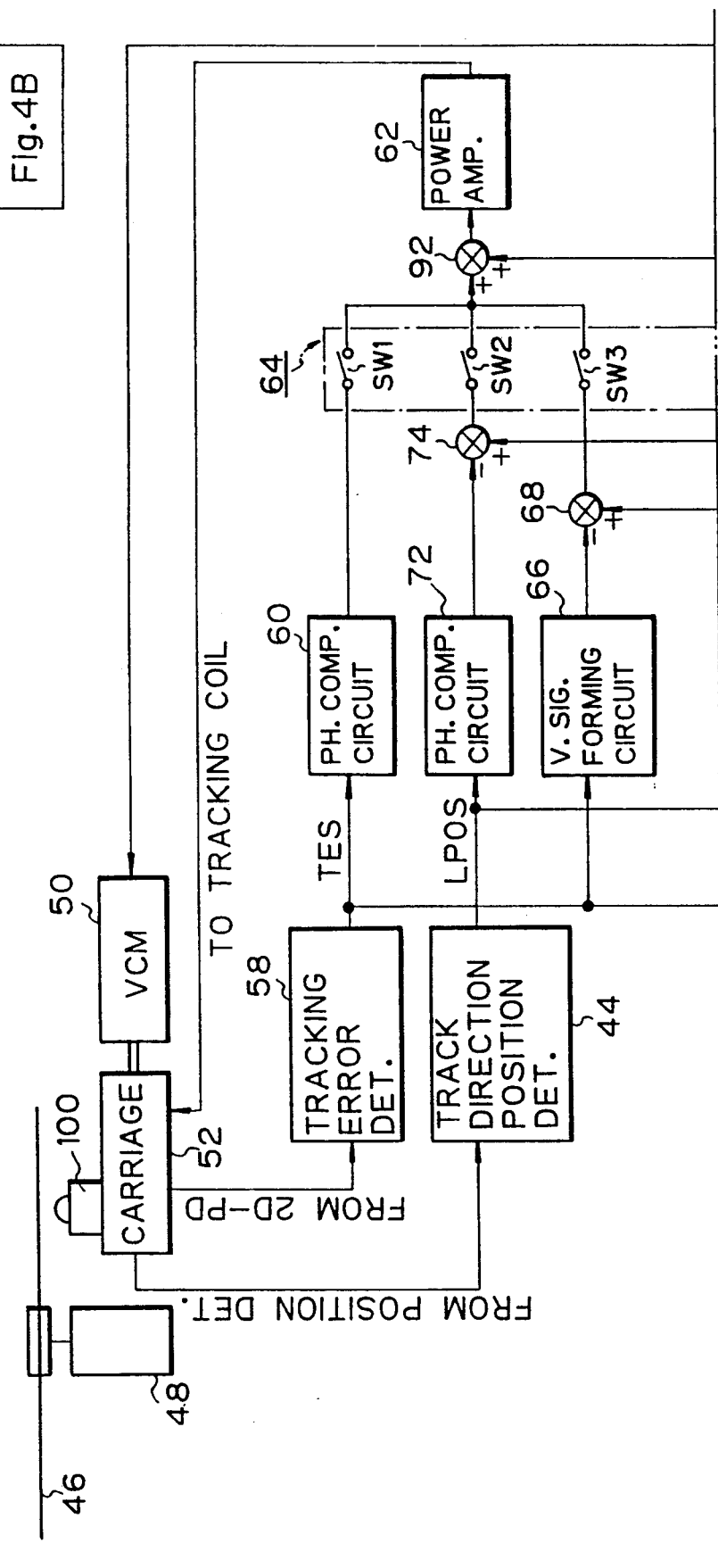
FIGS. 4, 4A and 4B are block diagrams of a tracking control circuit of an optical disk device according to an embodiment of the present invention.
Figure 4B:
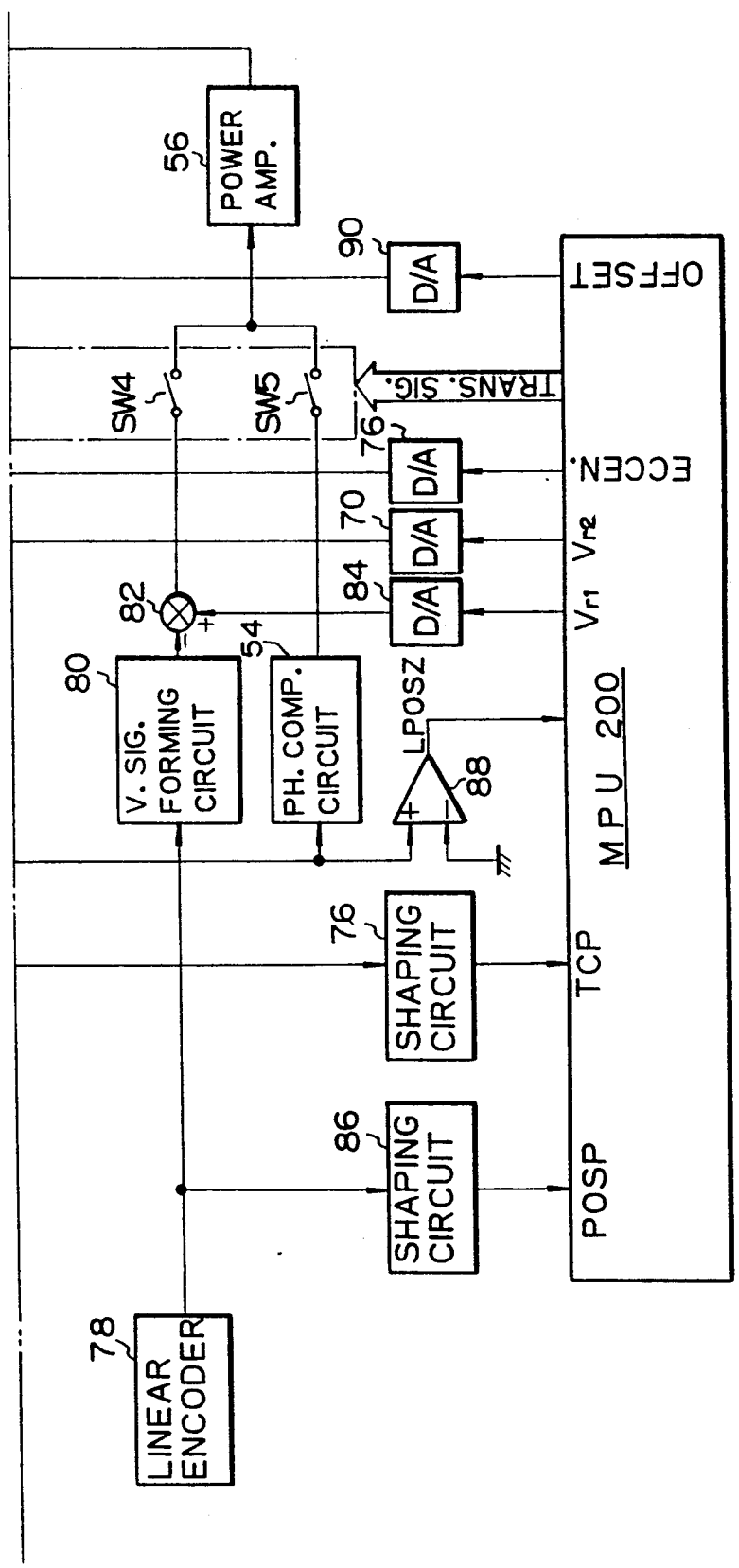

FIGS. 4A and 4B are block diagrams showing a tacking control circuit of an optical disk device according to an embodiment of the present invention.

Figure 12:
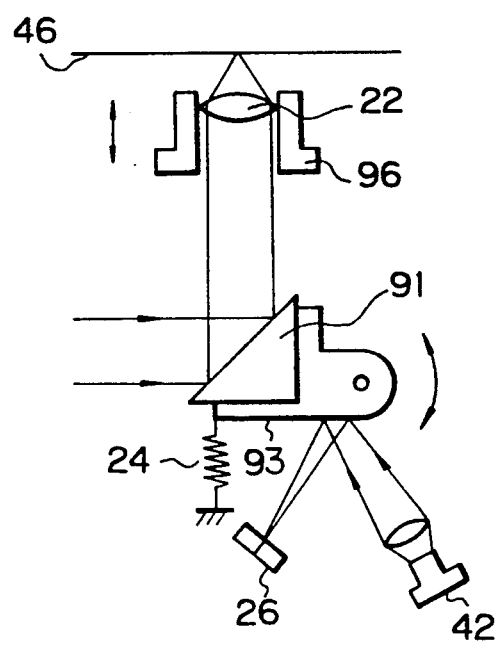
FIG. 12 is a diagram of a second example of an actuator in the optical disk device of FIGS. 4A and 4B.

In FIGS. 4A and 4B, 100 is an optical head mounted on a carriage 52 driven by a voice coil motor 50. The optical head 100 is moved radially over an optical disk 46 rotated at a constant revolution speed by a spindle motor 48. The optical head 100 is provided with an actuator, as shown in FIG. 8, FIG. 12, and FIG. 13, and a tracking coil 20 provided in the actuator moves the light beam within a predetermined number of tracks when the carriage 52 is stationary.

Figure 5:
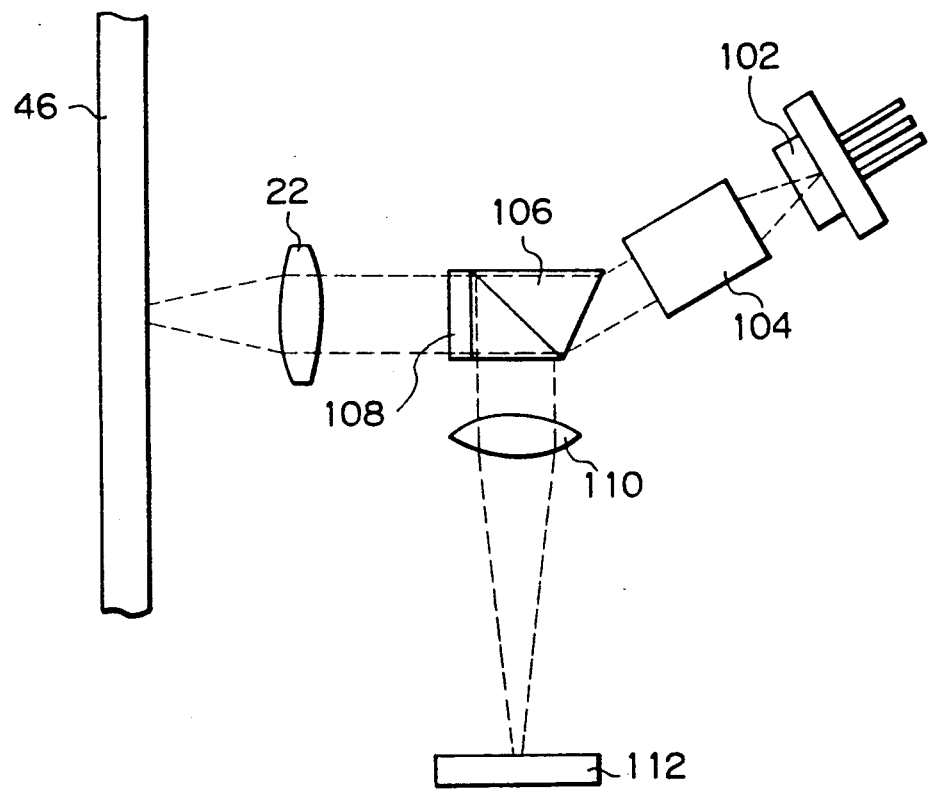
FIG. 5 is a diagram of an optical system according to the optical disk device of FIGS. 4A and 4B.

An example of a head optical system provided in the optical head 100 is shown in FIG. 5.

In FIG. 5, 102 is a semiconductor laser, 104 is a collimator lens converting elliptical diffused light from the semiconductor laser 102 to a circular parallel beam, and 106 is a polarized light beam splitter composed of a combination of two prisms. The polarized light beam splitter 106 passes a P (component) polarized light while reflecting an S (component) polarized light in the perpendicular direction. 108 is a λ/4 plate which converts incident linear polarized light to circularly polarized light, or incident circularly polarized light to linear polarized light, and 22 is an objects lens which illuminates the optical disk 46 with a beam spot. The beam spot has a track pitch of 1.6 micrometers, 110 is a converging lens for converging light reflected from the optical disk 46. The reflected light is reflected in the perpendicular direction by the polarized light beam splitter 106. 112 is a two-divided photodiode for detecting a tracking error and generating an output corresponding to a light intensity pattern in a portion wherein a zero order diffracted light and a first order diffracted light reflected by a track guide groove of the optical disk 46 by the converging lens 110 are overlapped. The method of detecting the tracking error by the two-divided photodiode 112 is known as a push-pull method or a far-field method.

Returning to FIGS. 4A and 4B, the tracking error detection output from the two-divided photodiode 112 provided in the light head 100 is supplied to a tracking error detector 58. The tracking error signal TES is detected as a difference of two outputs. Further, two outputs from a position detector 26 using a two-divided photodiode provided in the actuator are supplied to a track direction position detection circuit 44, and a track direction position detection signal LPOS is detected as a difference of the two outputs. The track direction position detection signal LPOS indicates a track position by the signal intensity, and a track direction by the signal polarity.

The tracking error signal TES from the tracking error detector 58 is supplied to a phase compensation (PH. COMP.) circuit 60 and a velocity signal (V. SIG.) forming circuit 66. The output of the phase compensation circuit 60 is supplied to a power amplifier (POWER AMP.) 62 through a transfer switch SW1 provided in a mode switching circuit 64. The output of the velocity signal forming circuit 66 is supplied to the power amplifier 62 through an adder 68 and a transfer switch SW3 of the mode switching circuit 64. The transfer switch SW1 of the mode switching circuit 64 is turned ON when the tracking servo is operated. At that time, the transfer switch SW3 connected to the velocity signal forming circuit 66 is made OFF. The transfer switch SW3 is turned ON when a track jump occurs, and at that time, the transfer switch SW1 is turned OFF and the tracking servo is made off. A target velocity signal Vr2 is supplied to the adder 68 receiving the output of the velocity signal forming circuit 66 from the MPU (microprocessor unit) 200 through a D/A (digital to analog) converter 70. The adder 68 generates a velocity error signal, and the velocity of the tracking coil 20 is controlled at the track jump.

Further, the detection signal LPOS of the track direction position detector 44 is supplied to the power amplifier 62 through a phase compensation circuit 72, an adder 74, and a transfer switch SW2 of the mode switching circuit 64. The transfer switch SW2 is turned ON upon a track pull-in after a rough access by the voice coil motor 50 is finished, and is turned ON when the tracking servo is operated by turning ON the transfer switch SW1 after the track pull-in is completed. At the track jump, wherein the transfer switch SW3 is made ON, the transfer switch SW2 and the transfer switch SW1 are turned OFF. A pre-measured eccentric amount(ECCEN.) of the optical disk 46 is input to the adder 74, by the MPU 200, through the D/A converter 76, in synchronization with the disk rotation, as a reference eccentric amount. Thus, the error signal of the position detection signal LPOS following the track eccentric amount is generated by the adder 74, and as a result, the power amplifier 62 supplies an electric current through the tracking coil 20 so that the actuator is moved by the pre-measured track eccentric amount.

The detection signal TES of the tracking error detector 58 is waveformed by a shaping circuit 76 and supplied to the MPU 200 as a track crossing pulse TCP. The MPU 200 counts the track crossing pulses TCP at the track jump. After reaching the target track number, the velocity control is transferred to the position control.

Below, the control system of the voice coil motor 50 is explained. The movement of the carriage 52 by the voice coil motor 50 is detected by a linear encoder 78. The detection signal of the linear encoder 78 is supplied to a velocity signal forming circuit 80, and the carriage velocity is detected. The velocity signal of the velocity signal forming circuit 80 is compared with the target velocity Vr1 input by the MPU 200 through a D/A converter 84 to an adder 82. The velocity error signal is generated and supplied to a power amplifier 56 through a transfer switch SW4, and thus the velocity of the voice coil motor 50 is controlled.

On the other hand, the detection signal LPOS of the track direction position detector 44 is supplied to a phase compensation circuit 54, the output of the phase compensation circuit 54 is supplied to the power amplifier 56 through a transfer switch SW5. Power amplifier 56 controls the voice coil motor 50 to execute a position control such that the track direction position detection signal LPOS becomes zero in accordance with the track direction position detection signal LPOS.

The output of the linear encoder 78 is supplied to the MPU 200 through a shaping circuit 86, as a position pulse POSP, the MPU 200 counts the position pulse POSP obtained at the track access by the velocity control of the voice coil motor 50, by turning ON the transfer switch SW4. After reaching the target position, the transfer switch SW4 is turned OFF, and simultaneously, the transfer switch SW5 is turned ON. Thus velocity control is switched to position control.

In the optical disk device in this invention formed by the double servo, there is newly provided a comparator 88 for determining whether or not the detection signal LPOS of the track direction position detector 44 has reached a zero signal state indicating a neutral position, and a D/A converter 90 for constantly supplying an offset current through the tracking coil 20 during a usual operation mode. The offset current is measured during the offset measuring mode. An adder 92 is provided the offset at the preceding stage of the power amplifier 62.

Further, the MPU 200 has a function of controlling the offset measuring means and the offset eliminating means.

Namely, if the offset measuring mode is set by an operator or software at the start of the operation in the optical disk device, the MPU 200, for example, outputs the decreasing offset data and converts it to an analog signal, for the D/A converter 90 during the predetermined step after starting a predetermined initial value when all the transfer switches SW1 to SW5 of the mode switching circuit 64 are OFF. The driving current supplied to the tracking coil 20 of the actuator by a supply thereof to the power amplifier 62 from the adder 92 is sequentially decreased. When the driving current through the tracking coil 20 is decreased, the detection signal LPOS of the track direction position detector 44, in accordance with the position detector 26, is supervised by the comparator 88. The MPU 200 stores and holds the offset data in the D/A converter 90 at that time, according to the output of the comparator 88 when the track direction position detection signal LPOS becomes a zero signal. In the usual operation after the end of the offset measuring mode, the offset data stored and held in the offset measuring mode is constantly supplied to the D/A converter 90 and added to the control signal obtained from the mode switching circuit 64 by the adder 92. The offset of the tracking error signal due to the spring force of the actuator is eliminated.

Figure 6:
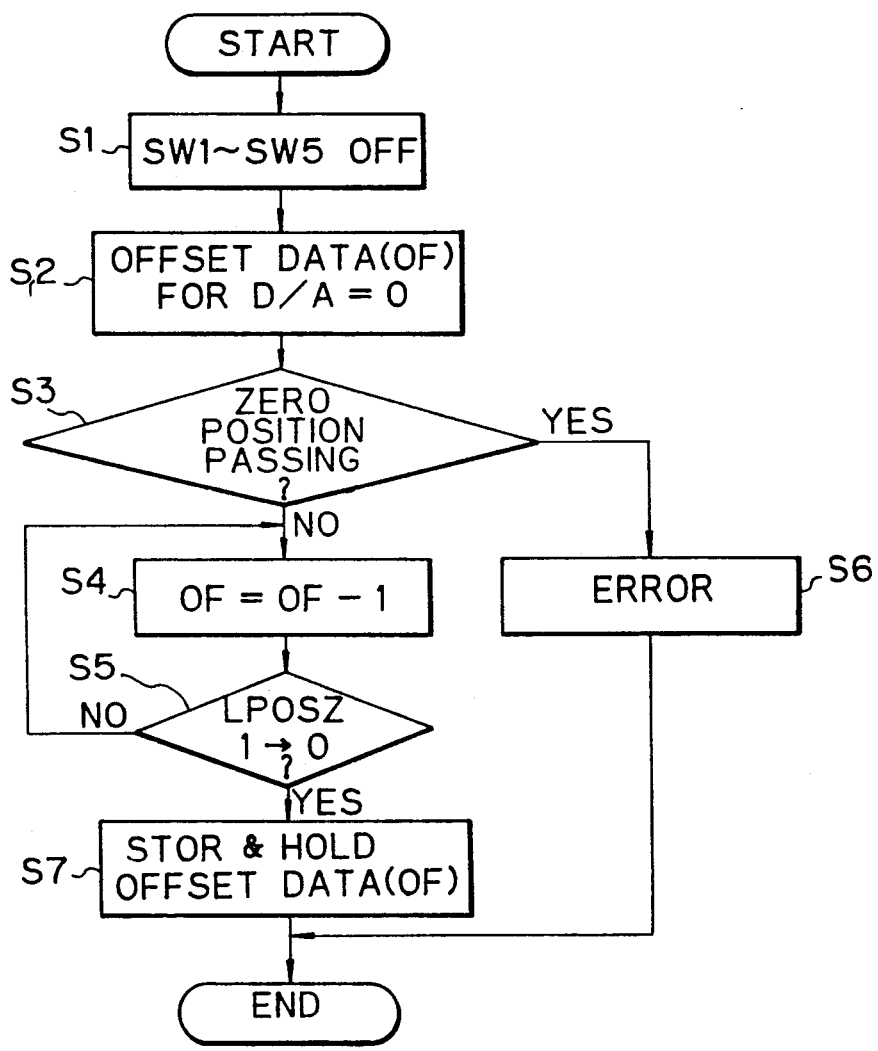
FIG. 6 is a flowchart of an offset measuring process in the optical disk device of FIGS. 4A and 4B.

FIG. 6 is a flowchart showing an offset measuring process by the MPU 200 according to the embodiment of FIGS. 4A and 4B.

In FIG. 6, if the offset measuring mode is set in the MPU 200, at least the transfer switches SW1 to SW5 provided in the mode switching circuit 64 are turned OFF at step 1, and the preparation for the measuring is executed.

The process then proceeds to step S2, and the offset data OF for the D/A converter 90 is set to zero. In step S3, the output of the comparator 88 is examined to determine whether or not the output has changed from 1 to 0 or 0 to 1, when the offset data is in the zero state. At that time, if the zero position is determined, the actuator itself is considered faulty, and the process proceeds to step S6. After the error is reported, the measuring process ends.

If the offset data is set to zero in step S3, when the output of the zero position is not received, the actuator is considered normal and the process proceeds to step S4. In step S4, for example, the maximum positive offset data value is set, the offset data is initially output as is, and the process proceeds to step S5. Then it is determined whether the output of the comparator 88 has reached zero. If the output has not reached zero, the process returns to step S4. In step S4, the offset data is decreased by 1 step (usually equal to the resolution of the D/A converter), and the processes of steps S4 and S5 are repeated. When the zero position is detected in step S5, during the process of the repeated decrease of the offset data by one step in steps S4 and S5, the process proceeds to step S7 and the offset data OF at that time is stored and held, and then the process is ended.

Figure 7:
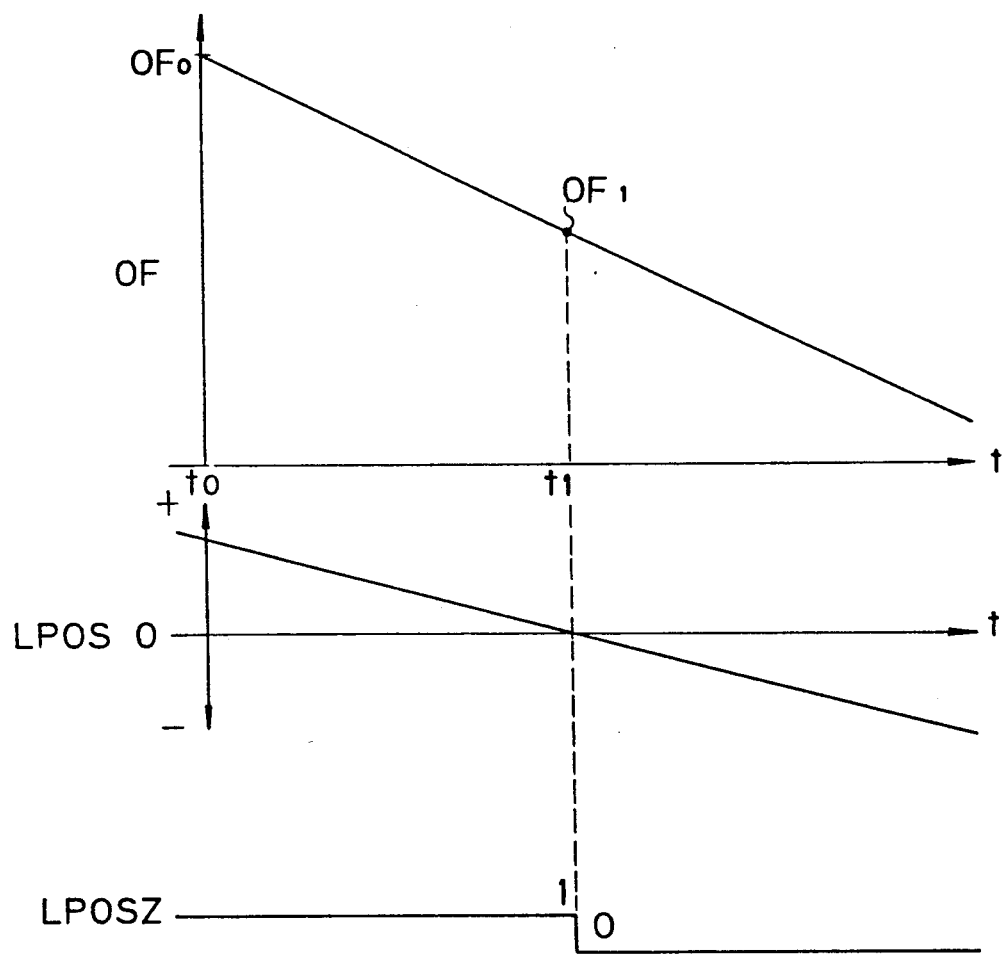
FIG. 7 is a showing graph for explaining an offset measuring process in the optical disk device of FIGS. 4A and 4B.

FIG. 7 shows a waveform diagram of the signals in the offset measuring process operation in FIG. 6. For example, assuming that the initial offset data OF0 is set to the D/A converter 90 at time t0, the track direction position signal LPOS corresponding to the offset data is obtained, and subsequently, the offset data is decreased 1 step by 1 step. As a result, the track position detection signal LPOS is decreased. If the track direction position detection signal LPOS reaches zero at the time t1, the track zero position signal LPOSZ as an output of the comparator is inverted from 1 to 0, and the offset data OF1 at that time is stored and held in the MPU 200.

The offset data obtained by the offset measuring process, as shown in FIGS. 6 and 7, during the usual operation mode is supplied to the D/A converter 90. The offset signal converted to an analog signal by the D/A converter 90 is supplied to the power amplifier 62 through the adder 92, and the offset signal is constantly applied to the tracking coil 20. Therefore, if the balanced position by the spring member of the actuator is different from the zero signal detection position by the position detector 26, the rotation of the actuator is maintained, so that the difference is eliminated, by the offset current passing through the tracking coil.

As a result, the actuator is driven by the offset current and the neutral position due to the spring member always coincides with the zero signal position of the position detector 26. Accordingly, the servocontrol using the voice coil motor 50 to correct the position difference is not executed. Therefore, if the unbalance due to the spring member exists, the offset of the tracking error signal TES can always be suppressed to zero. Thus, if the track jump is carried out, since the tracking error signal has no offset due to the velocity control of the actuator coil wherein as soon as the transfer switches SW1 and SW2 are tuned OFF the transfer switch SW3 is turned ON, at the end of the track jump the tracking error signal is rapidly converged to the zero position. Subsequently, simultaneously with the change of the tracking servo to ON, i.e., after the transfer switch S3 is turned OFF and the velocity control released, the transfer switches SW1 and SW2 are turned ON and the position control by the tracking servo can be carried out.

In the above embodiment, although an actuator which slidably rotates around an axis as shown in FIGS. 8, 9, and 10 is used, this invention can be applied to galvanomirror type and relay lens type actuators.

The galvanomirror type actuator shown in FIG. 12 is provided with a galvanomirror 91 which is tracking controlled. The galvanomirror is held at the neutral position by a spring member 24. A position detector comprises a reflection surface 93 of the mirror support portion, a light emitting portion 42, and a two-divided photodiode 26. The galvanomirror is moved by an electric current as shown by the arrow. This actuator is applied to the embodiment of FIGS. 4A and 4B. In addition, 96 is a focus actuator.

In the relay lens type actuator of FIG. 13, the relay lens 94 is moved perpendicular to the optical axis by an electric current and the tracking control is carried out. The position of the lens is balanced by a spring member 24 at a neutral position. This actuator further comprises a slit plate 40, a light emitting portion 42, and a two-divided photodiode 26. The light from the light emitting portion 42 is supplied to the two-divided photodiode through the slit plate 40. These elements form the position detector. Accordingly, the relay lens type actuator can be applied to the above-mentioned embodiment of FIGS. 4A and 4B.

Further, in the above embodiment, the offset of the track direction position detection signal is eliminated and the eccentric distance is eliminated in accordance with the track eccentric distance of the optical disk previously measured is explained, however, the described offset elimination process is applicable to an optical disk device not provided with the cancel control of this track eccentric distance.

By using this optical disk device and the offset eliminating method, if an offset is generated in the tracking error signal due to the spring force (the difference between the balanced position due to the spring member of the actuator rotation member and the neutral position (zero signal position) by the position detector), the offset can be eliminated by constantly applying a premeasured electric current for an offset elimination to the tracking coil and by coinciding the balanced position of the spring member with the neutral position of the position detector. Thus, the stability and the response characteristic can be increased at the track jump and a high speed track access can be realized.

I claim:
1. A device for eliminating an offset of an actuator comprising:
   an actuator including:
      a fixed member;
      a moving member mounted on said fixed member;
      drive means provided on said moving member;
      a spring member for holding the moving member to the fixed member at a predetermined neutral position when an electric power is not supplied to said drive means; and
      position detection means for detecting the neutral position of said moving member;
   offset measuring means for changing an electric drive current of said drive means and for storing and holding a value of an electric current supplied to said drive means when the detection output of a neutral position by said position detection means is obtained, in an offset measuring mode; and
   offset elimination means for eliminating the offset included in a moving means drive error signal by constantly supplying the electric drive current offset value stored and held in said offset measuring means to said drive means during an operation mode.

2. An optical disk device for eliminating an offset of an actuator comprising:
   an actuator including:
      a magnetic field structure;
      a rotation member rotatably mounted on said magnetic field structure;
      a tracking coil provided on said rotation member;
      a spring member for holding said rotation member at a predetermined neutral position when an electric power is not supplied to said tracking coil; and
      position detection means for detecting the neutral position of said rotation member when held by said spring member;
   offset measuring means for changing an electric drive current of said tracking coil and for storing and holding a value of an electric current supplied to said tracking coil when the detection output of a neutral position by said position detection means is obtained during an offset measuring mode; and
   offset elimination means for eliminating the offset included in a tracking error signal by constantly supplying the electric drive current offset value stored and held in said offset measuring means to said tracking coil during an operation mode.

3. An optical disk device as set forth in claim 2, wherein said offset measuring means comprises:
   a track direction position detector for receiving signals from said position detection means;
   a comparator for comparing an output of said track direction position detector with a reference voltage;
   an MPU for setting the current offset value; and
   a D/A converter for receiving the current offset value and carrying out a digital to analog conversion of the current offset value.

4. An optical disk device as set forth in claim 2, wherein said offset eliminating means comprises:
   an MPU for storing and holding the electric drive current offset value measured by said offset measuring means;
   a D/A converter for carrying out digital to analog conversion of the offset value to an analog value; and
   an adder for adding the analog value to the electric drive current during the operation mode.

5. An optical disk device for eliminating an offset in a tracking error signal of an actuator comprising:
   an actuator including
      a galvanomirror for reflecting light from a light source in a substantially perpendicular direction, said galvanomirror including first drive means for providing an electric drive current;
      an object lens for receiving the light reflected from said galvanomirror and supplying the light to the optical disk;
      a two-divided optical sensor for receiving light from the light source;
      position detection means for projecting a light from the light source to said two-divided optical sensor through another reflection surface of said galvanomirror and for detecting a neutral position thereof; and
      a spring member attached to said galvanomirror for balancing said galvanomirror in a balanced position;
   second drive means for providing offset measuring means for changing the electric drive current of said first drive means and for storing and holding an electric drive current value when the output of a detection of a neutral position by said position detection means is obtained during an offset measuring mode; and
   offset elimination means for eliminating the offset included in the tracking error signal by constantly supplying the electric drive current offset value stored and held in said offset measuring means to said first drive means during an operation mode.

6. An optical disk device for eliminating an offset in a tracking error signal of an actuator comprising:
   an actuator including:
      a relay lens for receiving light from a light source, and including drive means for providing an electric drive current;
      a mirror for reflecting the light from said relay lens in a substantially perpendicular direction;
      an object lens receiving the light reflected from said mirror and for illuminating an optical disk;
      a spring member for connecting said relay lens to a fixed board; and
      position detection means having:
         a slit connected to said relay lens and responsive to the movement of said relay lens in the direction perpendicular to the incident light;
         a light emitting source for supplying light therefrom to said slit; and
         a two-divided optical sensor for receiving the light from said light emitting source through said slit;
   offset measuring means for changing the electric drive current of said drive means and for storing and holding an electric drive current value when the output of a detection of a neutral position by said position detection means is obtained during an offset measuring mode; and
   offset elimination means for eliminating the offset in a tracking error signal by constantly supplying the electric drive current offset value stored and held in said offset measuring means to said drive means during an operation mode.

7. A method of eliminating offset in an optical disk device having an actuator including a moving member for a fine adjustment of tracking control when accessing an optical disk, a spring member for holding the moving member at a predetermined balanced position, and position detection means for detecting a neutral position of the moving member, the method comprising the steps of:
   a) increasing or decreasing an electric drive current supplied to the moving member, by a predetermined step when released from tracking control;
   b) storing the electric drive current value as an offset current when a position detection error signal, due to the position detection means, becomes zero; and
   c) supplying the offset current as an electric drive current for the moving member during a tracking control state.

* * * * *

UNITED STATES PATENT AND TRADEMARK OFFICE
CERTIFICATE OF CORRECTION

PATENT NO. : 5,189,653　　　　　　　　　　　　　　Page 1 of 2

DATED : FEBRUARY 23, 1993

INVENTOR(S) : SHIGENORI YANAGI

It is certified that error appears in the above-indentified patent and that said Letters Patent is hereby corrected as shown below:

TITLE PAGE, Column 2, after line 6, insert the following:
(item 56)

--302666　　2/1989　　Europe.

OTHER PUBLICATIONS

--Patent Abstracts of Japan, Vol. 012, No. 245 (P-729) July 12, 1988 & JP-A-63 037828 (RICOH CO. LTD.) February 18, 1988.

Patent Abstracts of Japan, Vol. 012, No. 086 (P-677) March 18, 1988 & JP-A-62 219335 (RICOH CO. LTD.) September 26, 1987.

Patent Abstracts of Japan, Vol. 011, No. 201 (P-590) June 30, 1987 & JP-A-62 022245 (SEIKO EPSON CORP.) January 30, 1987.--.

Col. 1, line 10, "thereby" should be --thereby.--.

Col. 2, line 45, "for" should be deleted;

UNITED STATES PATENT AND TRADEMARK OFFICE
CERTIFICATE OF CORRECTION

PATENT NO. : 5,189,653
DATED : FEBRUARY 23, 1993
INVENTOR(S) : SHIGENORI YANAGI

It is certified that error appears in the above-indentified patent and that said Letters Patent is hereby corrected as shown below:

Col. 3, line 1, "for" should be deleted;
line 27, "a" should be deleted;
line 29, "in" should be deleted;
line 64, "invention; r." should be --invention;--;
line 64, "FIGS. 4, 4A and 4B" should be --FIGS. 4A and 4B-- and this should be indented, with paragraph indentation.

Col. 4, line 3, "showing" should be deleted.

Col. 6, line 15, "objects" should be --object--.

Col. 7, line 67, "vided the" should be --vided for adding the--.

Col. 9, line 1, "track position" should be --track direction position--.

Signed and Sealed this

Fifth Day of April, 1994

Attest:

BRUCE LEHMAN

Attesting Officer  Commissioner of Patents and Trademarks